United States Patent [19]

Jabsen

[11] 4,252,613
[45] Feb. 24, 1981

[54] NUCLEAR FUEL ASSEMBLY GUIDE TUBE WITH INTEGRAL INTERMITTENT PROJECTIONS

[75] Inventor: Felix S. Jabsen, Lynchburg, Va.

[73] Assignee: The Babcock & Wilcox Company

[21] Appl. No.: 928,121

[22] Filed: Jul. 26, 1978

[51] Int. Cl.² ............................................. G21C 3/30
[52] U.S. Cl. .................................... 176/76; 176/78
[58] Field of Search ............................. 176/76, 78, 81

[56] References Cited

U.S. PATENT DOCUMENTS

| | | | |
|---|---|---|---|
| 3,034,975 | 5/1962 | Beurtheret | 176/81 X |
| 3,105,035 | 9/1963 | Weems | 176/81 X |
| 3,177,123 | 4/1965 | Huet | 176/81 X |
| 3,282,335 | 11/1966 | De Haller | 176/81 X |
| 3,361,640 | 1/1968 | Hassig et al. | 176/78 |
| 3,764,470 | 10/1973 | Calvin | 176/76 |
| 3,787,286 | 1/1974 | Anthony | 176/81 |
| 3,816,247 | 6/1974 | Cayol et al. | 176/78 |
| 3,862,000 | 1/1975 | Pugh et al. | 176/81 X |
| 3,930,941 | 1/1976 | Meerwald et al. | 176/81 |
| 4,003,787 | 1/1977 | Marmonier et al. | 176/78 X |

FOREIGN PATENT DOCUMENTS

| | | | |
|---|---|---|---|
| 1041355 | 2/1964 | United Kingdom | 176/81 |
| 1025703 | 4/1966 | United Kingdom | 176/81 |

Primary Examiner—Peter A. Nelson
Attorney, Agent, or Firm—Robert J. Edwards; Robert H. Kelly

[57] ABSTRACT

A nuclear fuel assembly includes guide tubes having integral ridges oriented and spaced to increase coolant flow in the gap between the guide tubes and adjacent fuel elements.

7 Claims, 7 Drawing Figures

NUCLEAR FUEL ASSEMBLY GUIDE TUBE WITH INTEGRAL INTERMITTENT PROJECTIONS

TECHNICAL FIELD

The invention relates to fuel assemblies for nuclear reactors and, more particularly, to an improved guide tube for fuel assemblies used in water-cooled nuclear reactors.

BACKGROUND ART

In water-cooled nuclear reactors, the reactor core in which the fission chain is sustained generally contains a multiplicity of fuel element assemblies, also known as fuel assemblies, that are identical in mechanical construction and mechanically interchangeable in any core fuel assembly location. Each fuel assembly is designed to maintain its structural integrity during reactor heatup, cool-down, shut-down and power operations including the most adverse set of operating conditions expected throughout its lifetime. Design considerations for reactor operation include the combined effects of flow induced vibration, temperature gradients, and seismic disturbances under both steady state and transient conditions.

Each fuel assembly typically contains a plurality of thin elongated fuel elements, a number of spacer grid assemblies, guide tubes, an instrumentation tube, and end fittings.

The fuel elements used in current applications are known as fuel rods and comprise cylindrical $UO_2$ fuel pellets stacked end to end within a thin walled tube (cladding), often having spring loaded plenums at each end of the tube, that is hermetically sealed with end caps or plugs. The fuel rod cladding is made from a material, such as a zirconium alloy, which has good neutron economy, i.e. a low capture cross section. Depending upon the position of a fuel assembly within the core, a number of elongated cylindrical guide tubes, arranged in parallel with fuel rods, are used variously to provide continuous sheath guidance for axially translatable control rods, axial power shaping rods, burnable poison rods, or orifice rods. Sufficient internal clearance is provided to permit coolant flow through the guide tubes to limit the operating temperatures of the absorber materials which may be inserted therein, and to permit rod insertion and withdrawal motions therewithin during all phases of reactor operation. The guide tubes have a larger cross-section or diameter than the fuel rods.

Each fuel rod transfers nuclear fission generated heat to circulating coolant water, circulating through parallel flow passages or coolant channels between the adjacent parallelpiped fuel rods, guide tubes and the instrumentation tube. The coolant channels are associated with an effective flow area transverse to the channel length. The various types of coolant channels are alternatively defined by the flow area between adjacent fuel rods (known as unit channels), by the flow area between a guide tube or instrument tube and adjacent fuel rods (known as guide tube channels), or by the flow area between fuel rods and an adjacent flow barrier such as the thermal shield of the reactor. The flow area of a guide tube channel is smaller than the flow area of a unit channel due to the larger cross-section of the guide tubes.

In each fuel assembly, fuel rods, guide tubes and instrumentation tube are typically supported in a square array at intervals along their lengths by spacer assemblies that maintain the lateral spacing between these components in an open-lattice arrangement. Each spacer assembly is generally composed of a multiplicity of slotted rectangular grid plates arranged to intersect and interlock in an egg-crate fashion to form cells through which the fuel rods and guide tubes extend in a parallel array. Illustratively, the grid plates may be of the type, such as described in U.S. Pat. No. 3,665,586 by F. S. Jabsen and assigned to The Babcock & Wilcox Company, which have indentations that laterally extend essentially perpendicular to the longitudinal axes of the fuel rods into those cells which have fuel rods for engagement and support of the fuel rods. These spacer grids typically accommodate and support the larger control rod guide tubes and the instrument tube in cells not having such indentations. Despite the difference in the diameter of the fuel rods relative to that of the guide tubes or instrumentation tube, all of these parallelpiped components are arrayed in a uniform square pitch, that is have equal center to center distance, within the fuel assembly.

The spacer assemblies maintain a necessarily precise spacing between fuel rods in order to avoid neutron flux peaks and regions of abnormally high temperature (hot spots) where burnout, i.e. severe local damage to the fuel rods, could occur. The spacer assemblies assure the mechanical stability that is essential to preclude the distortions which may be otherwise caused by flow induced vibrations, pressure differences, and thermal stress.

Coolant typically flows upwardly through the flow channels parallel to the surrounding members. Since the flow areas of the channels differ, the flow rate is not the same in each type of flow channel.

The design of the reactor core is limited by the heat transfer rate from the fuel to the coolant. The limiting or "critical" heat flux is defined by the onset of the departure from nucleate boiling (DNB). This condition marks the transition into an area of low heat transfer coefficient and a very high fuel element surface temperature which can eventually lead to burnout. DNB can occur if the fuel element heat flux is too great for a given coolant flow. Reactor core design criteria, therefore, are partly based on the establishment of a maximum permissible heat flux in the so-called "hot channel" which is a fraction of the calculated burnout flux. Safety margins between the maximum permissible heat flux and the critical heat flux, characterized as "minimum DNB ratios," are set for the various flow channel types in order to provide an adequate margin of safety under all conditions.

Experimental studies indicate that critical heat flux values in fuel element assemblies are generally lower in the smaller guide tube channels than in unit channels. Thus, the guide tube channels are, in the sense, a limiting factor in reactor operation, particularly within the "gap" defining the closest spacing between a guide tube and adjacent fuel rod.

SUMMARY OF THE INVENTION

The invention is directed to an improved guide tube which increases the critical heat flux in a guide tube channel within a fuel assembly of the type described.

In a preferred embodiment, the guide tube surface is integrally projected into the adjacent flow channels at spaced intervals about the perimeter of the guide tube and longitudinally along its length. The integral projections, which are angularly disposed with respect to the axis of the guide tube, intercept and direct some of the coolant from the mainstream of the adjacent flow channels into the gaps between the guide tube and adjacent fuel elements, thereby increasing the flow in the gaps.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
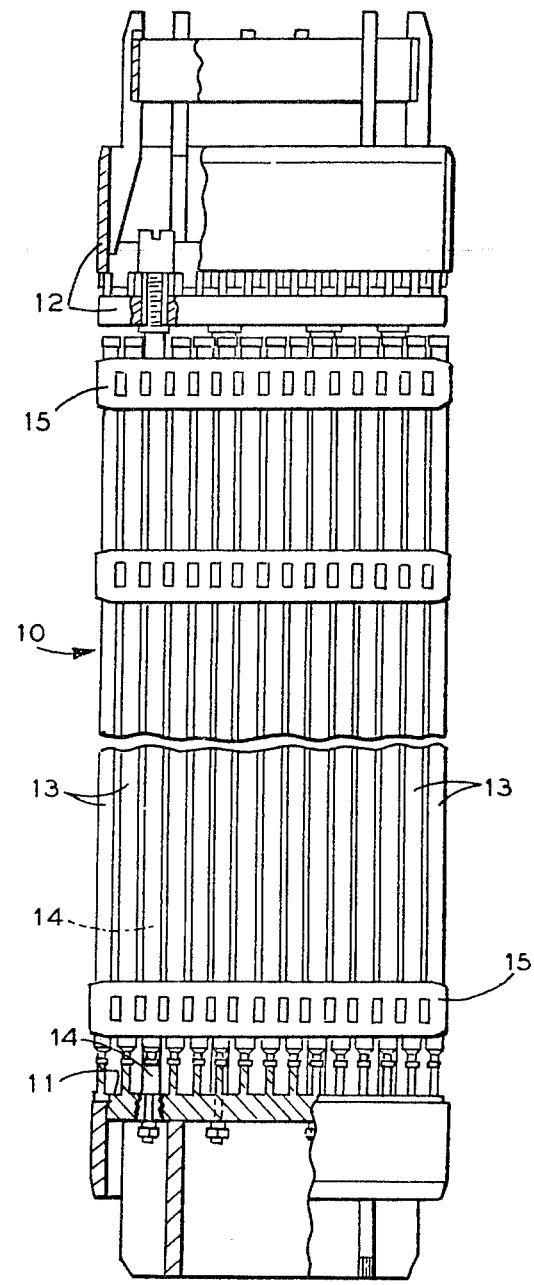
FIG. 1 is an elevation view, partly broken away and partly in section, of a fuel assembly.

FIG. 1 illustrates a fuel element assembly 10, oriented with its longitudinal axis in the vertical plane, including a lower end fitting 11, and upper end fitting 12, a plurality of elongated cylindrical fuel elements 13, hollow cylindrical guide tubes 14, a central instrumentation tube (not shown) and spacer grid assemblies 15. The fuel elements 13 and guide tubes 14 are laterally spaced and supported, on a uniform square pitch, in a generally square array by the spacer grid assemblies 15. The extremities of the guide tubes 14 are mechanically fixed to the lower 11 and upper 12 end fittings in a known manner, e.g. as shown in U.S. Pat. No. 3,828,868.

Figure 2:
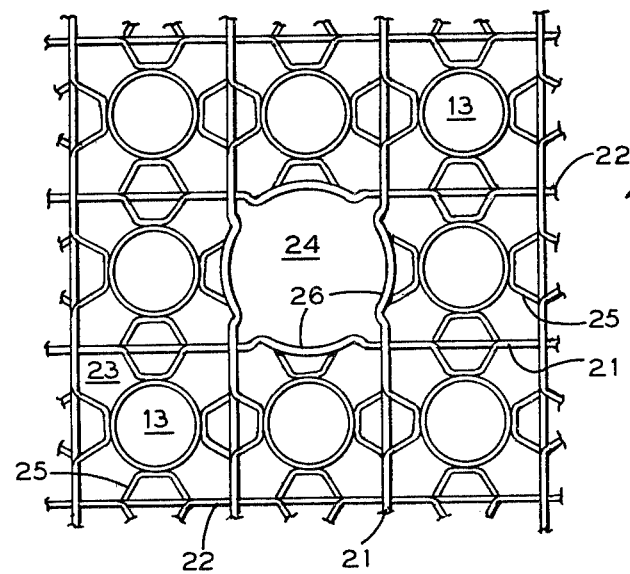
FIG. 2 is a plan view of a portion of a spacer grid assembly.

As shown in FIG. 2, each spacer grid assembly 15 is composed of grid plates 21, 22 which are slotted and fitted together in an "egg-crate" fashion to form fuel element cells 23 and guide tube cells 24 (only one of which is shown) through which the fuel elements and guide tubes will extend in a parallel array. The spacer grid plates 21, 22 are generally of the type described in U.S. Pat. No. 3,665,586 and, as is shown in FIG. 2, have indentations 25 laterally extending into the cells 23 which will contain fuel elements 13 for engagement and support of the fuel elements. The lengthwise edges of the grid plates 21, 22 are provided with arcuate saddles 26 in the wall portions of the plates that form the cells 24 through which the guide tubes 14 (not shown in FIG. 2) extend. The guide tubes 14 have larger cross-sections than the fuel elements 13, and the arcuate saddles 26 are shaped to conform to the shape of the guide tubes which are cylindrical in the preferred embodiment.

Figure 3:
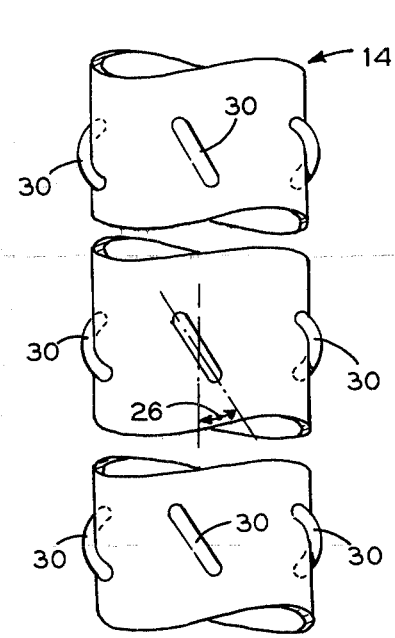
FIG. 3 is a partial elevation of a guide tube made in accordance with a preferred embodiment of the invention.

A guide tube 14 constructed in accordance with a preferred embodiment of the invention is illustrated in FIG. 3. A plurality of integral intermittent ridges 30 radially extend the guide tube surface at circumferentially and longitudinally spaced intervals. The ridges are preferably oriented at an angle 26 of inclination to the fuel assembly axis ranging from fifteen to thirty degrees. In the preferred embodiment, four circumferentially spaced ridges 30 are formed at longitudinally aligned and spaced intervals along the guide tube length.

Figure 4:
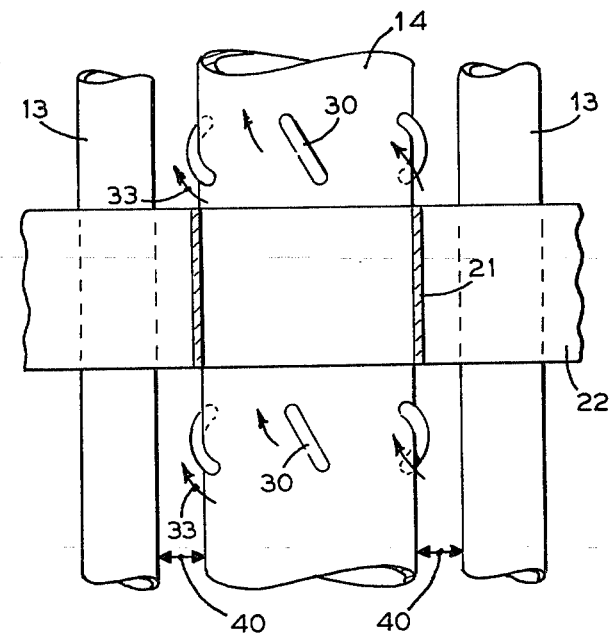
FIG. 4 is a vertical section of part of a fuel assembly incorporating guide tubes made in accordance with the invention.

An exemplary longitudinal orientation of the ridges within a fuel assembly is shown in FIG. 4. It is preferred that the ridges be spaced and angled so as to swirl, such as is illustrated by flow arrows 33, the most water into the gap 40 to achieve the lowest critical heat flux for the smallest angle of inclination with respect to the longitudinal axis. In this regard, it is not desired to divert flow from a guide tube channel into nearby unit channels for mixing purposes or the like as this represents a loss in the quantity of flow which can be diverted into the gap. A small angle of inclination and length of ridge 30 is desirable in order to minimize resistance to flow and to provide added assembly flexibility, that is, permit insertion of a guide tube into an initial assembly containing fuel elements and spacer grids assembled by techniques such as are disclosed in U.S. Pat. No. 3,933,583 wherein elongated elements traversing opening in the grid plates are rotated to flex the cell walls having indentations and permit insertion of a fuel rod without damage. By minimizing the length and angle of the ridges, the guide tube can be oriented with each ridge disposed in a corner of a cell 24 so that the guide tubes can be inserted through the cell for assembly. Thus, the guide tubes may be inserted into a spacer assembly having cells for receiving the guide tubes, each of which is arrayed amongst surrounding adjacent cells for the receipt of smaller diameter fuel elements, all the cells in the spacer assembly being arranged in an equal square pitch, after the surrounding cells have been loaded with fuel elements.

Figure 5:
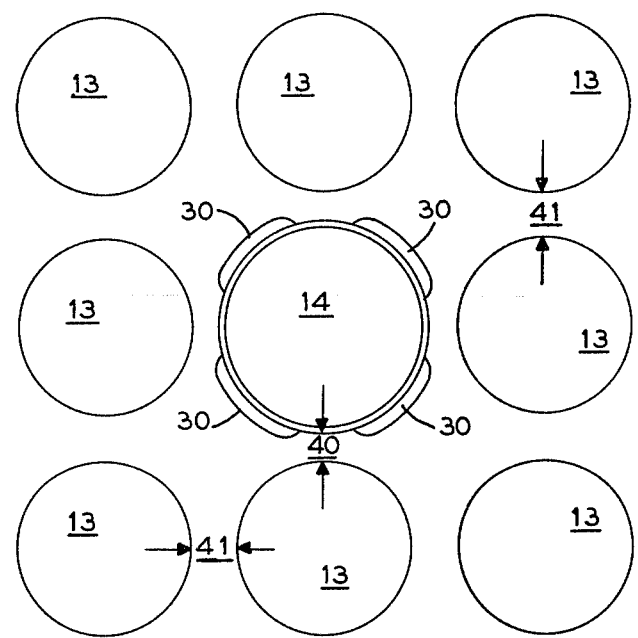
FIG. 5 is a plan view of part of an array of fuel elements and a guide tube spaced as by a spacer assembly in accordance with the invention.
Figure 6:
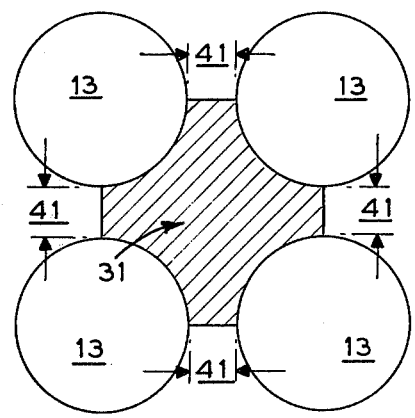
FIG. 6 is a schematic representation of a flow area (as illustrated by the shaded area) of a coolant channel.
Figure 7:
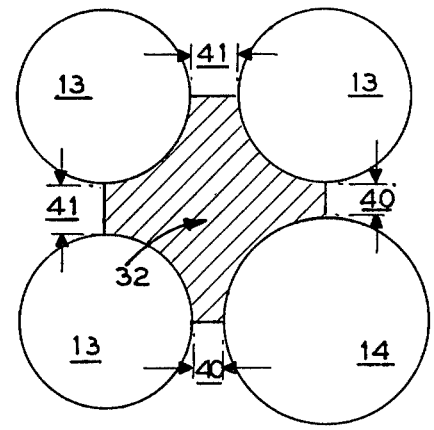
FIG. 7 is a schematic representation of a flow area (as illustrated by the shaded area) of another coolant channel.

In FIG. 5, a guide tube 14, constructed in accordance with the invention is illustrated in a plan sectional view with adjacent fuel elements 13 within a grid structure of the type shown in FIG. 2. As is shown schematically in FIG. 6, unit channels 31 are defined by the effective coolant flow area between adjacent fuel elements 13. Guide tube flow channels 32 are defined by the effective flow area between a guide tube 14 and adjacent fuel elements 13 as is shown in FIG. 7. Numeral 41 refers to the gap between fuel elements.

The reactor coolant generally flows within the unit channel 31 and guide tube flow channels 32 axially parallel to the fuel elements 13 and guide tubes 14. Each ridge 30 diverts some coolant flow from the guide tube flow channels into the gap 40 between the guide tube 14 and an adjacent fuel element 13 thereby increasing the coolant flow rate within the gap 40. In the preferred embodiment, as illustrated in FIG. 4, at least one longitudinal level of ridges 30 are disposed directly upstream of each spacer grid assembly. The increase in flow rate within the gap 40, correspondingly increases the allowable heat flux for a given minimum DNB ratio. The ridges also increase the local turbulence levels.

The hydraulic effects of guide tube ridges in accordance with the invention is further illustrated by, but not limited to, the following example:

EXAMPLE

The increase in gap velocity has been demonstrated by hydraulic testing of simulated fuel element assembly arrangements. The simulated fuel elements and guide tubes were arrayed in a square pitch having a center to center distance of 0.503-inches. Fuel rod outside diameter was 0.379-inches and the guide tube outside diameter was 0.465-inches. Hence, the gap between a fuel rod and guide tube was 0.081-inches. The spacer assembly utilized contained a plurality of plates having a 0.015-inch thickness arranged in intersecting and interlocking fashion to form an "egg-crate" type lattice of cells. The following two configuration tested (each ridge was 0.020-inches wide and 0.037-inches high):

|  | 1 | 2 |
|---|---|---|
| Rows of Ridges Between Spacer Assemblies | 4 | 8 |
| Distance Between Rows(inches) | 4 | 2 |
| Inclination of Ridge to longitudinal axis(degrees) | 15 | 22 |
| Length of Ridge(inches) | 0.596 | 0.301 |
| Gap/Bundle, average velocity ratio* | 0.87 | 0.89 |

*The gap to overall tube bundle average velocity ratio in a simulated assembly without ridges was 0.84.

The length of the ridges in the foregoing example limits the feasibility of insertion of guide tubes into a partially assembly unit. It is believed, however, that such guide tube, if constructed with ridges having a 0.187-inch length, a 0.136-inch width, and a 0.037-inch height, oriented at a twenty-two degree angle from the longitudinal axis and spaced every two inches along the length of the guide tube, would be more than adequate for achieving the purposes described herein.

The hydraulic-thermal benefit of the guide tube ridges represents a favorable balance between two competing hydraulic effects. The area of the smaller guide tube channels inherently leads to higher pressure drops or lower flow rates relative to the larger parallel unit channels. The lower flow rate affects both the temperature rise of the coolant and of the fuel element surface thereby leading to critical heat flux limitations. The introduction of guide tube ridges into the guide tube channels promotes flow diversion from these channels. A net benefit occurs only if the local modification of the flow pattern within the guide tube channels results in an increased flow through the narrow gaps between the guide tube and adjacent fuel element in which DNB is believed to initiate. As the frontal area and angle of the ridges is increased to make them more effective devices for directing flow through the gaps, the flow blockage in the critical channels increase flow diversion. Thus, the hydraulic-thermal benefit of the ridges rests on a delicate balance. In this regard, it should be understood that it is not desired to utilize the guide tube ridges for generally mixing flow within the fuel element assembly as such would not efficiently increase the flow rate in the gap.

The guide tube ridges described herein may be formed, for example, by dimpling the wall of a hollow guide tube into an external die cavity by internal hydraulic pressure.

The embodiments of the invention in which an exclusive property or privilege is claimed are defined as follows:

1. In a nuclear reactor fuel assembly having a plurality of generally equal diameter fuel elements and at least one larger diameter guide tube longitudinally extending in parallel and laterally spaced in a uniform square pitch array having equal center to center distance by intersecting grid members, said lateral spacing defining longitudinal coolant flow channels having a first spaced distance between adjacent fuel elements and a second smaller spaced distance between an adjacent fuel element and a guide tube, the improvement which comprises an integral intermittent projection extending the outside surface of the guide tube into an adjacent coolant flow channel so as to divert some of the flow from the adjacent coolant flow channel into a gap defined by said second smaller spaced distance between the guide tube and an adjacent fuel element.

2. An improved guide tube as recited in claim 1 wherein a plurality of the integral intermittent projections are disposed at spaced intervals about the perimeter of the guide tube.

3. An improved guide tube as recited in claim 1 or 2 wherein a plurality of the integral projections are longitudinal spaced at intervals along the length of the guide tube.

4. An improved guide tube as recited in claim 3 wherein the integral projections are disposed at an angle of inclination with respect to the longitudinal axis of the guide tube.

5. An improved guide tube as recited in claim 4 wherein the angle of inclination with the longitudinal axis is between fifteen and thirty degrees.

6. An improved guide tube as recited in claim 4 wherein the guide tube is cylindrical and four integral projections are equidistantly spaced about the circumference of the guide tube at longitudinally spaced intervals.

7. An improved guide tube as recited in claim 5 wherein the guide tube is cylindrical and four integral projections are equidistantly spaced about the circumference of the guide tube at longitudinally spaced intervals.

* * * * *

UNITED STATES PATENT AND TRADEMARK OFFICE
CERTIFICATE OF CORRECTION

PATENT NO. : 4,252,613

DATED : February 24, 1981

INVENTOR(S) : Felix S. Jabsen

It is certified that error appears in the above-identified patent and that said Letters Patent are hereby corrected as shown below:

Claim 3, line 2, insert --intermittent-- after "integral".

Claim 4, line 2, insert --intermittent-- after "integral".

Claim 6, line 2, delete "the guide tube is cylindrical and"; and insert --intermittent-- after "integral".

Signed and Sealed this

Thirtieth Day of June 1981

[SEAL]

Attest:

RENE D. TEGTMEYER

Attesting Officer

Acting Commissioner of Patents and Trademarks